Figure 1:
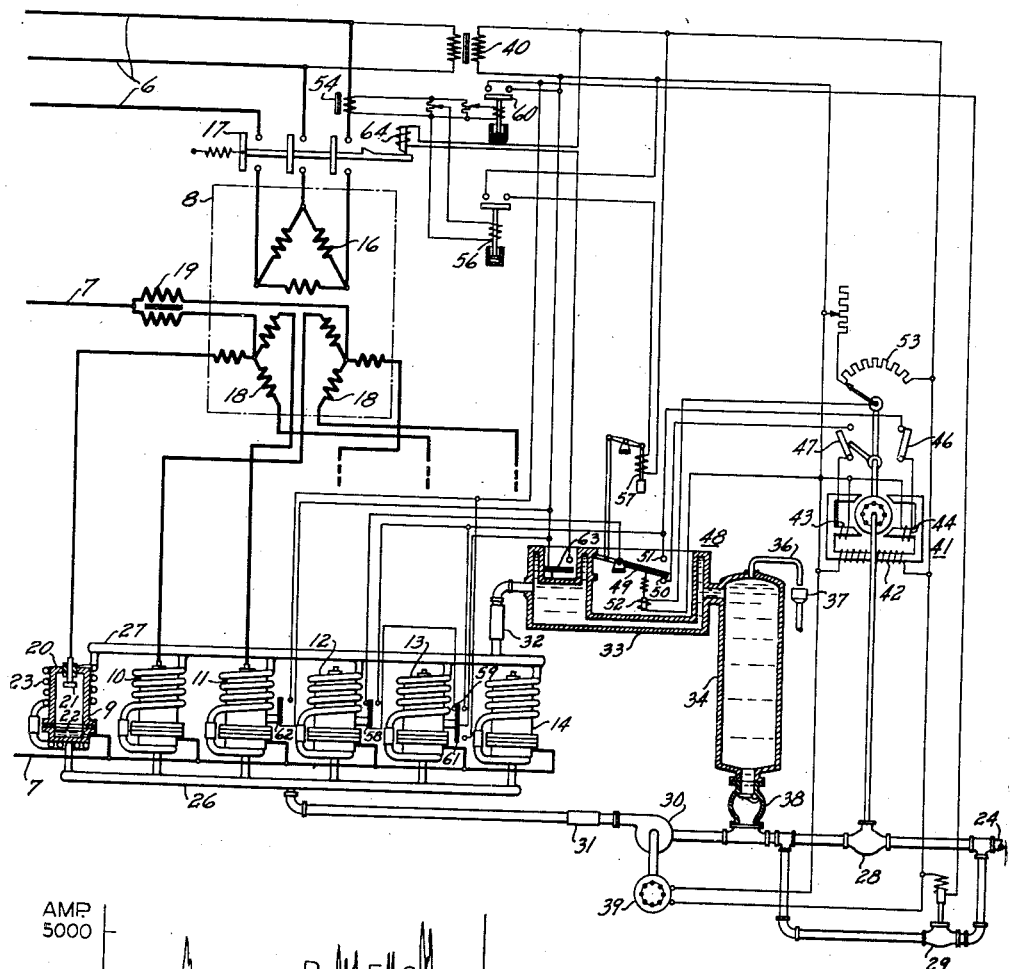

Sept. 23, 1941.    S. R. DURAND    2,256,757
ELECTRICAL VALVE CONTROL SYSTEM
Filed Nov. 4, 1939

Inventor
S. R. Durand
by
Attorney

Patented Sept. 23, 1941

2,256,757

UNITED STATES PATENT OFFICE 2,256,757

ELECTRICAL VALVE CONTROL SYSTEM

Samuel R. Durand, Milwaukee, Wis., assignor to Allis-Chalmers Manufacturing Company, Milwaukee, Wis., a corporation of Delaware Application November 4, 1939, Serial No. 302,817

20 Claims. (Cl. 250—27)

This invention relates in general to improvements in the control of the temperature of devices cooled by circulation of a cooling fluid and more particularly to the control of the operation of electrical devices such as electric valves of relatively low thermal capacity.

Electric valves for high outputs of the order of thousands of amperes are generally provided with a vaporizable cathode and with a plurality of anodes arranged within a large water jacketed casing. A large chamber is thus provided for the expansion and condensation of vapor generated at the cathode during operation so that the vapor pressure within the device remains at permissible values even when the temperature of the casing wall varies within wide limits. In such valves the thermal capacity of the wall and of the water contained within the jacket is relatively large and the temperature of the wall therefore changes relatively slowly in response to changes in the flow of current through the valve. A control of the flow of the water in response to the temperature of the water discharged from the water jacket is therefore generally adequate.

On the contrary, electric valves of the type provided with a single main anode and a vaporizable cathode have a casing of relatively small volume preferably provided with a cooling coil of relatively small thermal capacity. While such valves may be cooled by simply allowing the maximum flow of cooling water to take place through the coils, it is generally preferred to regulate the flow of water and to recirculate some of the discharged water to reduce the water consumption. This regulation should take into account the variations in the flow of current through the valves and even anticipate the current variations to be expected, but a simple current responsive control does not give the desired result when the current varies rapidly, as in valves supplying current to a traction system. It is then preferable to depend mainly on a control responsive to the temperature of the water discharged from the valve cooling coils and to the temperature of the valve walls, and also to modify the setting of the control or even to render the control ineffective when the flow of current through the valves exceeds predetermined values. When a group of several electric valves is employed, a control responsive to the average temperature of the cooling water discharged from the valve coils may be supplemented by a control selectively responsive to the temperature of the wall of the valve having the highest temperature.

It is therefore an object of the present invention to provide a control system for an electrical device cooled by a flow of fluid for maintaining the temperature of the device within predetermined limits even when the flow of current through the device is subject to wide fluctuations.

Another object of the present invention is to provide a control system for an electrical device cooled by a flow of fluid operable to maintain within predetermined limits the temperature of a device of low thermal capacity.

Another object of the present invention is to provide a control system for an electrical device cooled by a flow of fluid for placing the device in proper operating condition in anticipation of probable load conditions.

Another object of the present invention is to provide a control system for an electrical device cooled by a flow of fluid for reducing the flow of cooling fluid through the device to the minimum value consistent with safe operation.

Another object of the present invention is to provide a control system for the joint control of a plurality of electrical devices connected in parallel to a common source of cooling fluid.

Figure 2:
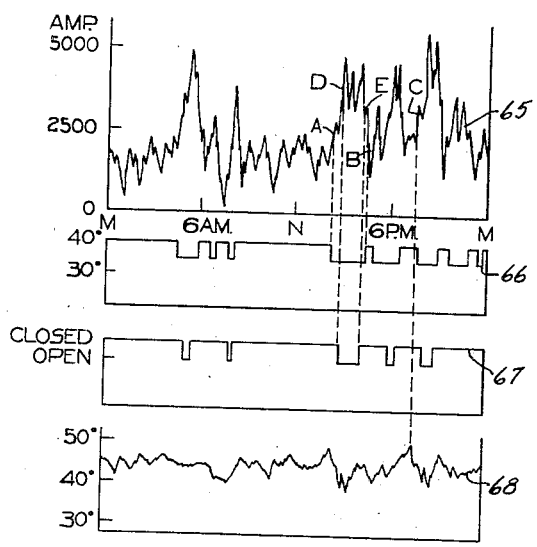

Objects and advantages other than those above described will be apparent from the following description when read in connection with the accompanying drawing, in which:

Fig. 1 diagrammatically illustrates one embodiment of the present invention applied to the control of a group of six electric valves forming part of an alternating current rectifying system; and Fig. 2 is a typical diagram of the daily operation of the system illustrated in Fig. 1.

Referring more particularly to the drawing by characters of reference, reference numeral 6 designates an alternating current circuit to be connected with a direct current circuit 7 through a converting system comprising a transformer 8 and a plurality of electric valves 9 to 14, inclusive. Either circuit 6 or circuit 7 may be chosen as supply circuit for the system, but it will be assumed that circuit 6, for example, is the supply circuit energized from a suitable generator (not shown) and that circuit 7 is the output circuit transmitting current to suitable load devices (not shown). Although the load devices may be of any kind, a system controlled as herein described is particularly advantageous for the supply of current to the traction motors of the vehicles of an extensive urban transportation system.

Transformer 8 comprises a primary winding 16 subdivided into a plurality of phase portions connectable with circuit 6 through a switch 17. Winding 16 is disposed in inductive relation with a secondary winding 18 comprising a plurality of phase portions severally connected with one of the conductors of circuit 7 through valves 9 to 14. Winding 18 is preferably arranged to define a plurality of neutral points severally connected with the other conductor of circuit 7 through an interphase transformer 19.

Valves 9 to 14 are preferably of a uniform design, valve 9, for example, comprising a metallic casing 20 enclosing within the wall thereof a single main anode 21 and a cathode 22. The cathode preferably consists of a pool of a suitable liquid conductor such as mercury held within a cathode receptacle insulated from casing 20. The different cathodes are severally provided with suitable known means (not shown) for bringing and maintaining the cathodes in electron emitting condition.

Valve 9 is provided with a cooling coil 23 forming a passage adapted to conduct cooling fluid such as cold water supplied thereto from a system of distribution represented by an inlet pipe 24. The cooling coils of the different valves are preferably connected in parallel between a pair of manifolds 26, 27. If the cooling coils comprise portions in contact with the associated cathode receptacles, such portions may be connected with the portions in contact with the casings through insulating portions each preferably consisting of a length of rubber hose. Insulating connections may also be provided between the cooling coils and manifold 27, if it is desired to maintain the casings of the valves insulated from one another.

Pipe 24 is connected with manifold 26 through a motor operated throttle valve 28 connected in parallel with a solenoid operated stop valve 29, a pump 30, and a length of rubber hose 31. The water discharged from the cooling coils flows through manifold 27, a length of rubber hose 32, a conduit 33, a reservoir 34, and an overflow pipe 36 from which the water drops into a funnel shaped drain pipe 37. A portion of the water discharged from the cooling coils is recirculated therethrough from reservoir 34 through a check valve 38 by means of pump 30. Pump 30 is continuously driven by any suitable motor, such as an induction motor 39 energized from a suitable source of alternating current such as a transformer 40 energized from circuit 6.

Valve 28 controlling the flow of fluid from supply pipe 24 to the cooling coils may be of any type adjustable to different positions for variably obstructing the connection between pipe 24 and the cooling coils. The degree of opening of valve 28 may be adjusted by means of a suitable motor, such as a shaded pole induction motor 41 comprising a field winding 42 energized from transformer 40 and a pair of selectively short circuitable shading coils 43, 44 controlled by limit switches 46, 47. In order to maintain the wall temperature of the valve casings at substantially a predetermined value, motor 41 is controlled in response to the average temperature of the water discharged from the different cooling coils into manifold 27. The temperature responsive means therefor consists of a highly sensitive thermostat 48 of the bimetallic type immersed in conduit 33.

Thermostat 48 comprises a bimetallic central contact 49 having a high rate of displacement for a small change in the temperature of the water within conduit 33. Contact 49 cooperates with a pair of stationary contacts 50, 51 inserted in the circuits of coils 43 and 44, respectively. Contact 49 is variably biased towards contact 50 by means of an anti-hunting solenoid 52 energized from transformer 40 through a voltage divider 53 having a tap actuated by motor 41. Contacts 49, 50 and 51 may be adjusted to cause engagement thereof at any desired temperature. For example, contacts 49 and 51 may be caused to close when the water within conduit 33 is at a temperature higher than 40° C. by a fraction of a degree, contacts 49 and 50 closing at a temperature lower than 40° C. by a fraction of a degree. The cooling coils and pump 30 are so dimensioned that the walls of the valve casings are then at a temperature reaching approximately 48° C. when the valves jointly carry their rated current, for example, 2500 amperes.

The operation of valves 9 to 14 is further controlled in response to an electrical condition thereof by means of a current transformer 54 connected in circuit 6 and supplying current to the coil of a time delay relay 56. The contacts of relay 56 connect transformer 40 with a solenoid 57 arranged to control the operation of thermostat 48 by displacing one of the points of attachment of contact 49 against the action of solenoid 52, to thereby control the flow of water through the cooling coils. Relay 56 is so adjusted as to close its contacts in response to the flow of current only above a predetermined selected magnitude through valves 9 to 14 for a predetermined length of time. For example, the contacts of relay 56 may close when the average flow of current through valves 9 to 14 has exceeded 2500 amperes for ten minutes to thereby reset thermostat 48 so as to cause the temperature of the water discharged from the cooling coils to be maintained at a lower value, for example, 35° C. The walls of the valves then assume a temperature of approximately 43° at full load. Relay 56 returns to the position shown when the average flow of current through the valves has remained below 2000 amperes for ten minutes.

Means are further provided for rendering thermostat 48 ineffective and to cause opening of valve 28 independently thereof in response to rise of temperature of the walls of valves 9 to 14 above a predetermined value higher than the value determined by thermostat 48. These means comprise at least one thermostat 58 responsive to the temperature of the wall of valve 12 and operable upon rise of this temperature above 50° for example, to disconnect contact 49 from shading coils 43 and 44 and to short circuit coil 44. In general the temperatures of valves 9 to 14 will be substantially equal as the valves normally carry substantially equal currents and are cooled by substantially equal flows of cooling water. A single thermostat may therefore be sufficient to prevent rise of the temperature of any of the valve walls above the maximum desired value. If, however, unbalances in the flow of current through the two windings of interphase transformer 19 are apt to occur, thermostat 58 may be supplemented by another thermostat 59 associated with a valve serially connected with the winding of transformer 19 with which valve 12 is not serially connected. Thermostats 58, 59 restore the controlling action of thermostat 48 when the temperature of the valve walls has dropped below 45°, for example. If desired, the other four valves may also be provided with additional thermostats cooperating with thermostat 58, but in general such thermostats would be superfluous.

The connection between supply pipe 24 and the cooling coils is additionally controlled in response to an electrical condition of valves 9 to 14 such as the flow of current therethrough only above a predetermined magnitude for a predetermined length of time. This control is effected by means of valve 29, the solenoid of which may be connected with transformer 40 through the contacts of a second time delay relay 60 energized from current transformer 54. Relay 60 may be adjusted to close its contacts, for example, when the flow of current through valves 9 to 14 has exceeded 3750 amperes for a length of time of 15 seconds, and to reopen its contacts when the current has decreased below 3200 amperes for 15 seconds. The solenoid of valve 29 may also be energized in response to rise of the temperature of the walls of valves 9 to 14 above the value for which thermostats 58, 59 are adjusted by means of further thermostats 61, 62. The latter thermostats may be set to close their contacts when the walls of the associated valves reach a temperature of 55° and to reopen their contacts when the wall temperature drops below 50°. A thermostat 63 is provided for energizing the trip coil 64 of switch 17 to cause the switch to open when the temperature of the water within conduit 33 reaches 60°.

In operation, the system being connected as shown on the drawing and circuit 6 being energized, motor 39 receives current from transformer 40 and drives pump 30. Water is thereby circulated from reservoir 34 through check valve 38, pump 30, hose 31, manifold 26, cooling coils such as 23 of valves 9 to 14, manifold 27, hose 32 and conduit 33 back to reservoir 34. Switch 17 then being open, heat is not evolved in valves 9 to 14 and the circulating water is therefore at a low temperature. Contacts 49 and 50 of thermostat 48 are therefore in engagement to short circuit shading coil 43. Valve 28 is, however, assumed to be closed so that the circuit of coil 43 is open at switch 47 and motor 41 remains at standstill.

When the cathodes of valves 9 to 14 have been rendered conductive in any known manner, switch 17 may be closed manually and held closed by means of its latch. Current then flows from circuit 6 through winding 16 of transformer 8, which current induces in winding 18 unidirectional current impulses impressed on circuit 7 through valves 9 to 14 to form a substantially uniform flow of direct current therethrough. The evolution of heat in the different valves generally causes the temperature of the water circulated by pump 30 to tend to rise above the limit of 40° for which thermostat 48 is adjusted. As soon as the water temperature rises through 40°, contact 49 disengages contact 50 and engages contact 51, thereby short circuiting shading coil 44. Motor 41 accordingly gradually opens valve 28. Cold water is thereby supplied from pipe 24 to pump 30 and is mixed with the circulating water while an equal amount of hot water is discharged from overflow 36 into drain 37.

Motor 41 also moves the tap of voltage divider 53 to cause the voltage impressed on solenoid 52 to increase gradually. The downward pull exerted by solenoid 52 on contact 49 is thereby increased until contacts 49 and 51 separate. Coil 44 is thereby open circuited and motor 41 stops. A converse operation takes place when the flow of current decreases to cause valve 28 to close to a corresponding extent. The action of voltage divider 53 is to cause contact 49 to return towards its intermediate position before the temperature of the water in conduit 33 has returned to the desired value to prevent overtravel of valve 28 and the resulting hunting of the valve and of the thermostat. If the flow of current through valves 9 to 14 does not fluctuate rapidly, thermostat 48 thus maintains the temperature of the water within conduit 33 substantially at the desired value of 40°, and the walls of valves 9 to 14 accordingly assume a temperature which does not exceed 48° at the full load of 2500 amperes with a minimum consumption of cooling water.

Thermostat 48, however, does not permit alone a satisfactory control of the temperature of valves 9 to 14 under the usual load conditions of urban transportation systems in which the current demand may vary by several hundred percent in a few seconds while a valve such as valve 28 usually requires as long as two minutes to open fully from its closed position. In Fig. 2 curve 65 represents an actual daily load diagram of a rectifying system of the type herein described which will serve for the study of the operation of the different control elements of the system. This diagram was drawn neglecting the continual momentary load variations which may amount to as much as 2000 amperes. These momentary load variations cause the temperature of the walls of valves 9 to 14 to vary continually and it would therefore seem desirable to render thermostat 48 responsive to the temperature of the walls of the valves. Such control, however, would be disadvantageous because thermostat 48, which is highly sensitive to temperature differences, would then cause valve 28 to operate continually without thereby rendering the temperature of the valve walls more uniform on account of the time lag introduced in the control by the flow of water from valve 28 to the cooling coils. The momentary fluctuations of the wall temperature do not affect thermostat 48 in the system shown for the reason that conduit 33 contains a mixture of water volumes having flowed through the cooling coils at different instants. A continuous control of valve 28 by means of a relatively insensitive thermostat, such as thermostat 58 responsive to the wall temperature, would also be disadvantageous as such control would cause opening and closing operations of valve 28 of excessive amplitude and would therefore cause valve 28 to hunt.

It will be observed that load diagram 65 presents two periods in which the load does not exceed the normal capacity of valves 9 to 14 and two portions of so-called peak loads in which the valve capacity is exceeded. During periods of normal load the slowness of action of valve 28 is not detrimental because the temperature of the walls of valves 9 to 14 never rises very fast. During peak load periods, however, the load may reach such magnitudes in such a short time as to cause excessive heating of the valve walls before full response of thermostat 48 and valve 28. To overcome this drawback, thermostat 48 is reset for a lower temperature by relay 56 as soon as the load has exceeded 2500 amperes during ten minutes, as during interval AB, for example.

At point A the load is not yet excessive and would not require the resetting of the thermostat, but such resetting is caused to take place because the increase of the load to 2500 amperes is known to be an indication that much higher loads may be expected to follow. Whereas a control of valve 28 continuously responsive to the magnitude of the load current through valves 9 to 14 would always regulate the temperature of the valve walls with a time lag, relay 56 actually anticipates the occurrence of current flows above 2500 amperes through valves 9 to 14. Thermostat 48 then causes the temperature of valves 9 to 14 to be lowered by 5° so that upon occurrence of overloads of moderate magnitudes, the temperature of valves 9 to 14 generally cannot become excessive before valve 28 has had time to operate. Relay 56 also opens its contacts in response to a decrease in the flow of current through valves 9 to 14 below 2000 amperes in anticipation of probable further decreases in such flow of current. The changes in the setting of thermostat 48 in response to the operation of relay 56 are shown on curve 66 in Fig. 2.

It may also occur that the temperature of the walls of valves 9 to 14 reaches 50°, as for example, at point C. At that point the load increases suddenly from a value bringing the wall temperature to the highest normal temperature of 48° to a higher value causing the wall temperature to increase further before relay 56 closes its contacts. Thermostat 58 or 59 then operatively disconnects thermostat 48 from motor 41 and causes motor 41 to open valve 28 until the wall temperature is lowered to 45°. The temperature of the water in conduit 33 accordingly drops below 35° until thermostats 58 and 59 return to the position shown.

When an overload has reached the limit contemplated by the provision of relay 56, relay 60 closes its contacts to cause valve 29 to open as during interval DE in Fig. 2, for example. The supply of cold water to pump 30 is then at its maximum regardless of the actual value of the flow of current through valves 9 to 14 or of any temperature, so that valves 9 to 14 are then in condition to carry any current within their overload capacity. Relay 60 thus anticipates the occurrence of normal overloads which might otherwise cause overheating of the valve walls even when thermostat 48 has been reset by means of relay 56. When the flow of current through valves 9 to 14 again decreases as at point E, relay 60 opens its contacts and causes valve 29 to reclose in anticipation of further decrease in the value of the flow of current through valves 9 to 14. Under the assumed load conditions, the position of valve 29 follows diagram 67 in Fig. 2.

The course of the temperature of the walls of valves 9 to 14 as a result of the operation of thermostats 48, 58 and 59 and of relays 56 and 60 under the assumed conditions may be represented by curve 68 in Fig. 2.

Thermostat 58 or 59 may also function if the flow of current through valves 9 to 14 becomes unbalanced. If the voltages appearing between the conductors of circuit 6 comprise harmonic components, for example, the voltages impressed on circuit 7 from winding 18 through one winding of interphase transformer 19 may be different from the voltages impressed through the other winding of interphase transformer 19. As a result therefrom, valves 9, 11 and 13, for example, conduct more current than valves 10, 12 and 14. The walls of valves 9, 11 and 13 then attain a common higher temperature than the walls of valves 10, 12 and 14 and thermostat 59 may operate in response thereto to cause opening of valve 28 even when the average load of the system is less than its full load.

If the temperature of the valve walls reaches 55° for any reason such as excessively high temperature of the fresh water supplied through pipe 24, thermostat 61 causes opening of valve 29 and maintains valve 29 open until the temperature of the valve walls has dropped to 50°. If the temperature of the water within conduit 33 reaches 60° because of the failure of any part of the control system to function properly, thermostat 63 completes the circuit of coil 54 with the result that switch 17 interrupts the flow of current through valves 9 to 14.

From the above analysis of the operation of the system, it will be apparent that the walls of valves 9 to 14 are prevented from attaining excessively high temperatures during operation of the valves. This result is obtained with a minimum number of operations of the thermostats and of the water valves, even when the flow of current through the valves to be cooled is subject to wide and rapid fluctuations. When the flow of current is of moderate magnitude and does not fluctuate widely, the fresh water consumption of the system is reduced to a minimum amount.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. The combination with an electrical device provided with a passage adapted to conduct cooling fluid, and a source of cooling fluid connected with said passage through parallel connections, of means for controlling the temperature of said device comprising means responsive to a thermal condition of said device for controlling one of said connections, and means responsive to an electrical condition of said device for controlling another of said connections.

2. The combination with an electrical device provided with a passage adapted to conduct cooling fluid, and a source of cooling fluid connected with said passage, of means for controlling the temperature of said device comprising means responsive to a thermal condition of said device for controlling a connection between said source and said passage, and means responsive to the flow of current only above a predetermined magnitude through said device for a predetermined length of time for controlling a connection between said source and said passage.

3. The combination with an electrical device provided with a passage adapted to conduct cooling fluid, and a source of cooling fluid connected with said passage, of means for controlling the temperature of said device comprising means responsive to a thermal condition of said device for controlling the flow of fluid from said source through said device, and means responsive to the flow of current only above a predetermined magnitude through said device for a predetermined length of time for controlling said flow of fluid.

4. The combination with an electrical device provided with a passage adapted to conduct cooling fluid, and a source of cooling fluid connected with said passage, of means for controlling the operation of said device comprising means responsive to the temperature of the fluid discharged from said passage for variably obstructing the connection between said source and said passage to maintain said temperature at substantially a predetermined value, and means responsive to the flow of current only above a predetermined magnitude through said device for a predetermined length of time for placing said passage in substantially unobstructed connection with said source.

5. The combination with an electrical device comprising a casing wall and a passage adapted to conduct cooling fluid, and a source of cooling fluid connected with said passage, of means for maintaining the temperature of said wall at substantially a predetermined value comprising means responsive to the temperature of said wall for variably obstructing the connection between said source and said passage, and means responsive to an electrical condition of said device for placing said passage in substantially unobstructed communication with said source.

6. The combination with an electrical device comprising a casing wall and a passage adapted to conduct cooling fluid, and a source of cooling fluid connected with said passage, of means for controlling the operation of said device comprising means responsive to the temperature of said wall for variably obstructing the connection between said source and said passage to maintain said temperature at substantially a predetermined value, and means responsive to the flow of current only above a predetermined magnitude through said device for a predetermined length of time for placing said passage in substantially unobstructed connection with said source.

7. The combination with an electrical device comprising a wall and defining a passage adapted to conduct cooling fluid, a source of cooling fluid connected with said passage, and means for controlling the flow of fluid from said source through said passage, of means for controlling the operation of said device comprising means responsive to the temperature of the fluid discharged from said passage for controlling said flow controlling means to maintain the temperature of said wall at substantially a predetermined value, and means responsive to rise of the temperature of said wall above another predetermined value higher than the first said value for rendering ineffective the first said temperature responsive means.

8. The combination with an electrical device comprising a wall and defining a passage adapted to conduct cooling fluid, a source of cooling fluid connected with said passage, and means for controlling the flow of fluid from said source through said passage, of means for controlling the operation of said device comprising means responsive to the temperature of the fluid discharged from said passage for controlling said flow controlling means to maintain the temperature of said wall at substantially a predetermined value, and means responsive to rise of the temperature of said wall above another predetermined value higher than the first said value for causing opening of said flow controlling means independently of the first said temperature responsive means.

9. The combination with an electrical device comprising a wall and defining a passage adapted to conduct cooling fluid, a source of cooling fluid connected with said passage, and means for controlling the flow of fluid from said source through said passage, of means for controlling the operation of said device comprising means responsive to the temperature of the fluid discharged from said passage for controlling said flow controlling means to maintain the temperature of said wall at substantially a predetermined value, means responsive to rise of the temperature of said wall above another predetermined value higher than the first said value for causing opening of said flow controlling means independently of the first said temperature responsive means, and a second means for controlling said flow of fluid responsive to an electrical condition of said device.

10. The combination with an electrical device comprising a wall and defining a passage adapted to conduct cooling fluid, a source of cooling fluid connected with said passage, and means for controlling the flow of fluid from said source through said passage, of means for controlling the operation of said device comprising means responsive to the temperature of the fluid discharged from said passage for controlling said flow controlling means to maintain the temperature of said wall at substantially a predetermined value, means responsive to rise of the temperature of said wall above another predetermined value higher than the first said value for rendering ineffective the first said temperature responsive means, and a second means for controlling said flow of fluid responsive to the flow of current only above a predetermined magnitude through said device for a predetermined length of time.

11. The combination with an electrical device comprising a wall and defining a passage adapted to conduct cooling fluid, a source of cooling fluid connected with said passage, and means for controlling the flow of fluid from said source through said passage, of means for controlling the operation of said device comprising means responsive to the temperature of the fluid discharged from said passage for controlling said flow controlling means to maintain the temperature of said wall at substantially a predetermined value, means responsive to rise of the temperature of said wall above another predetermined value higher than the first said value for causing opening of said flow controlling means independently of the first said temperature responsive means, and a second means for controlling said flow of fluid responsive to the temperature of said wall.

12. The combination with an electrical device comprising a wall and defining a passage adapted to conduct cooling fluid, a source of cooling fluid connected with said passage, and means for controlling the flow of fluid from said source through said passage, of means for controlling the operation of said device comprising means responsive to the temperature of the fluid discharged from said passage for controlling said flow controlling means to maintain the temperature of said wall at substantially a predetermined value, means responsive to rise of the temperature of said wall above another predetermined value higher than the first said value for rendering ineffective the first said temperature responsive means, and a second means for controlling said flow of fluid responsive to rise of the temperature of said wall above a third predetermined value higher than the second said value.

13. The combination with an electrical device provided with a passage adapted to conduct cooling fluid, and a source of cooling fluid connected with said passage, of means for controlling the operation of said device comprising means responsive to the temperature of the fluid discharged from said passage for variably obstructing the connection between said source and said passage to maintain said temperature at substantially a predetermined value, and means responsive to an electrical condition of said device for causing said temperature responsive means to maintain said temperature at substantially another predetermined value.

14. The combination with an electrical device provided with a passage adapted to conduct cooling fluid, and a source of cooling fluid connected with said passage, of means for controlling the operation of said device comprising means responsive to the temperature of the fluid discharged from said passage for variably obstructing the connection between said source and said passage to maintain said temperature at substantially a predetermined value, and means responsive to the flow of current only above a predetermined magnitude through said device for a predetermined length of time for causing said temperature responsive means to maintain said temperature at substantially another predetermined value lower than the first said value.

15. The combination with a plurality of substantially identical devices conducting nominally equal electric currents subject to unbalances each comprising a wall and provided with a passage adapted to conduct a cooling fluid, and a source of cooling fluid connected with said passages, of means for controlling the operation of said devices comprising means responsive to the temperature of the particular one of said walls having the highest temperature for controlling the flow of fluid from said source through said passages.

16. The combination with a plurality of substantially identical devices conducting nominally equal electric currents subject to unbalances each comprising a wall and provided with a passage adapted to conduct a cooling fluid, and a source of cooling fluid connected with said passages, of means for controlling the operation of said devices comprising means responsive to the average temperature of the fluid discharged from said passages for controlling the flow of fluid from said source through said passages, and a second means for controlling said flow of fluid reponsive to the temperature of the particular one of said walls having the highest temperature.

17. The combination with an electrical device provided with a passage adapted to conduct cooling fluid, a source of cooling fluid connected with said passage, and means for controlling the flow of fluid from said source through said passage, of means for controlling the operation of said device comprising means responsive to the flow of current only above a predetermined magnitude through said device for a predetermined length of time for controlling said flow controlling means.

18. The combination with an electrical device provided with a passage adapted to conduct cooling fluid, and a source of cooling fluid connected with said passage, of means for controlling the operation of said device comprising means responsive to the temperature of the fluid discharged from said passage for variably obstructing a connection between said source and said passage to maintain said temperature at substantially a predetermined value, and means responsive to the flow of current only above a predetermined magnitude through said device for a predetermined length of time for providing another connection between said source and said passage.

19. The combination with an electrical device comprising a casing wall, means in heat conductive relation with said wall defining a passage adapted to conduct cooling fluid, and a source of cooling fluid connected with said passage, of means for controlling the operation of said device comprising means responsive to the temperature of the fluid discharged from said passage for variably obstructing a connection between said source and said passage to maintain the temperature of said wall within a predetermined range, and means responsive to rise of the temperature of said wall beyond said range for providing another connection in parallel with the first said connection between said source and said passage.

20. The combination with an electrical device comprising a casing wall, means in heat conductive relation with said wall defining a passage adapted to conduct cooling fluid, and a source of cooling fluid connected with said passage, of means for controlling the operation of said device comprising means for controlling a connection between said source and said passage, means responsive to the temperature of the fluid discharged from said passage for controlling said connection controlling means to maintain said temperature at substantially a predetermined value, means responsive to the flow of current only above a predetermined magnitude through said device for a predetermined length of time for causing said temperature responsive means to maintain said temperature at substantially another predetermined value lower than the first said value to thereby maintain the temperature of said wall within a predetermined range, and means responsive to rise of the temperature of said wall beyond said range for rendering the first said temperature responsive means ineffective and for causing full opening of said connection controlling means.

SAMUEL R. DURAND.